(12) United States Patent
Huh

(10) Patent No.: US 6,827,060 B2
(45) Date of Patent: Dec. 7, 2004

(54) DEVICE FOR VARYING THE FUEL-AIR MIXTURE FLOW TO AN ENGINE

(75) Inventor: Jong-Hoe Huh, Seoul (KR)

(73) Assignee: Hyundai Motor Company, Seoul (KR)

( * ) Notice: Subject to any disclaimer, the term of this patent is extended or adjusted under 35 U.S.C. 154(b) by 16 days.

(21) Appl. No.: 10/329,134

(22) Filed: Dec. 23, 2002

(65) Prior Publication Data
US 2003/0150422 A1 Aug. 14, 2003

(30) Foreign Application Priority Data
Dec. 24, 2001 (KR) .......................... 2001-83976

(51) Int. Cl.$^7$ .............................................. F02B 31/00
(52) U.S. Cl. .................... 123/336; 123/337; 123/306
(58) Field of Search ............................... 123/336, 337, 123/306, 308, 301, 302, 400, 399, 184.56; 251/305

(56) References Cited

U.S. PATENT DOCUMENTS

| | | | | |
|---|---|---|---|---|
| 4,413,598 A | * | 11/1983 | Tsutsumi | 123/306 |
| 5,165,374 A | * | 11/1992 | Chapman et al. | 123/308 |
| 5,311,848 A | * | 5/1994 | Isaka et al. | 123/188.14 |
| 5,477,823 A | * | 12/1995 | Uchida | 123/308 |
| 5,551,392 A | * | 9/1996 | Yamaji et al. | 123/306 |
| 5,640,941 A | * | 6/1997 | Hazen et al. | 123/306 |
| 5,806,484 A | * | 9/1998 | Yoneyama et al. | 123/308 |
| 6,394,066 B1 | * | 5/2002 | Chou et al. | 123/308 |
| 6,478,011 B2 | * | 11/2002 | Paffrath | 123/336 |
| 6,575,133 B2 | * | 6/2003 | Ries-Mueller et al. | 123/306 |
| 6,634,333 B2 | * | 10/2003 | Fujieda et al. | 123/308 |
| 6,705,280 B1 | * | 3/2004 | Lippert | 123/306 |

FOREIGN PATENT DOCUMENTS

| | | | | |
|---|---|---|---|---|
| JP | 2001-248449 | | 9/2001 | |
| KR | 2003-054915 | * | 7/2002 | ........... F02B/31/00 |

* cited by examiner

*Primary Examiner*—Hai Huynh
(74) *Attorney, Agent, or Firm*—Morgan Lewis & Bockius LLP

(57) ABSTRACT

The present invention relates to a device for varying the fuel-air mixture flow to an engine, and more particularly, to a device for varying the fuel-air mixture flow to the engine that can change the fuel-air mixture reaching the combustion chamber, thus improving fuel combustion and reducing pollution. A preferred embodiment of the invention delays spark timing based on engine speed and fuel-air mixture flow to further improve engine performance. The device comprises an actuator and a manipulator for changing the fuel-air mixture flow through an intake manifold into the engine in response to control signals transmitted from an electronic control unit.

7 Claims, 4 Drawing Sheets

DEVICE FOR VARYING THE FUEL-AIR MIXTURE FLOW TO AN ENGINE

FIELD OF THE INVENTION

The present invention relates to a device for varying the fuel-air mixture flow to an engine, and more particularly, to a device for varying the fuel-air mixture flow to the engine that can change the fuel-air mixture reaching the combustion chamber, thus improving fuel combustion and reducing pollution.

BACKGROUND OF THE INVENTION

A conventional internal combustion engine (typically a four cycle engine) is provided with a valve device that includes intake and exhaust valves. These valves deliver a fuel-air mixture to a combustion chamber for combustion and discharge the burnt mixture, during compression and expansion strokes, respectively. The valves close to seal the combustion chamber while the fuel-air mixture is ignited, thereby providing power.

The exhaust inevitably generates environmental pollution. It is, therefore, important to develop engines that are capable of reducing pollution in the exhaust by increasing combustion efficiency.

There are various methods for reducing exhaust pollution and for improving combustion efficiency. These methods can be classified into two categories. One is to optimize the structure of the combustion chamber, while the other is to control the flow of fuel-air mixture in order to improve the mixing of the fuel-air mixture.

There is a drawback to the method of optimizing the structure of the combustion chamber. It is financially prohibitive and time consuming to develop structures for a combustion chamber. There are also drawbacks to the method of controlling the flow of the fuel-air mixture. The necessary structure is complicated and flow control of the fuel-air mixture is usually performed by completely closing or opening the structure controlling the flow of the fuel-air mixture. This makes it very difficult to optimally control the amount of the fuel-air mixture infused into the combustion chamber, particularly over an entire load region that ranges from idling to high speed running.

SUMMARY OF THE INVENTION

A preferred embodiment of the present invention provides a device that is adapted to gradually change the flow of the fuel-air mixture infused into a combustion chamber and to induce turbulence in the flow. A preferred embodiment also delays the spark time corresponding to the amount of the fuel-air mixture infused. Preferably, the ignition timing delay is based on plate position and engine speed. The invention thereby improves the engine combustion efficiency and the engine torque and reduces pollution under particular operating conditions.

In accordance with a preferred embodiment of the present invention, an actuator is mounted at one side of an intake manifold for generating power in response to control signals transmitted from an electronic control unit. A manipulator receives the power transmitted from the actuator to adjust the opening of each port at the intake manifold.

BRIEF DESCRIPTION OF THE DRAWINGS

For fuller understanding of the nature of the invention, reference should be made to the following detailed description and the accompanying drawings, in which.

Like numerals refer to similar elements throughout the several drawings.

DETAILED DESCRIPTION OF THE INVENTION

Figure 1:
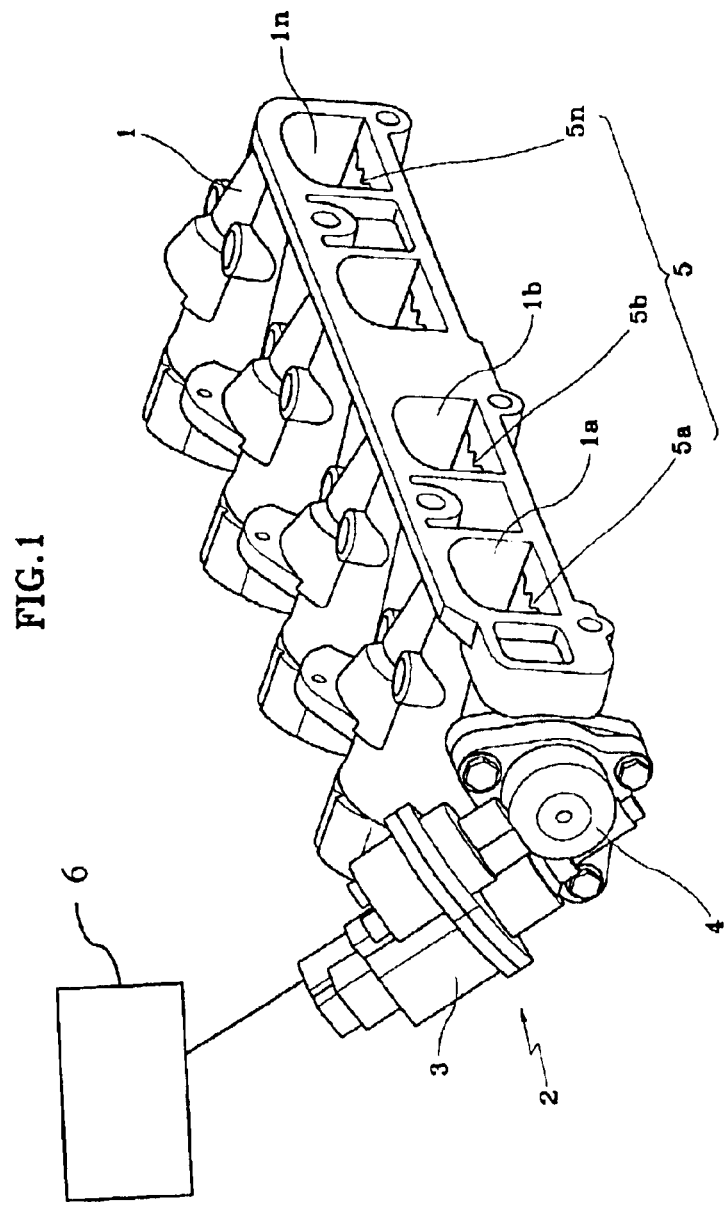
FIG. 1 is a schematic view of a preferred embodiment of an intake manifold equipped with a device for varying the flow of the fuel-air mixture according to the present invention.

As shown in FIG. 1, an intake manifold 1 is formed with a plurality of ports (1a, . . . , 1n corresponding to the number of combustion chambers) each connected to a combustion chamber of an engine. An actuator 2 is mounted at one side of the intake manifold 1. Actuator 2 responds to a control signal supplied by an Electronic Control Unit 6 (ECU). Typically, the ECU 6 also controls other aspects of engine operation.

Figure 2:
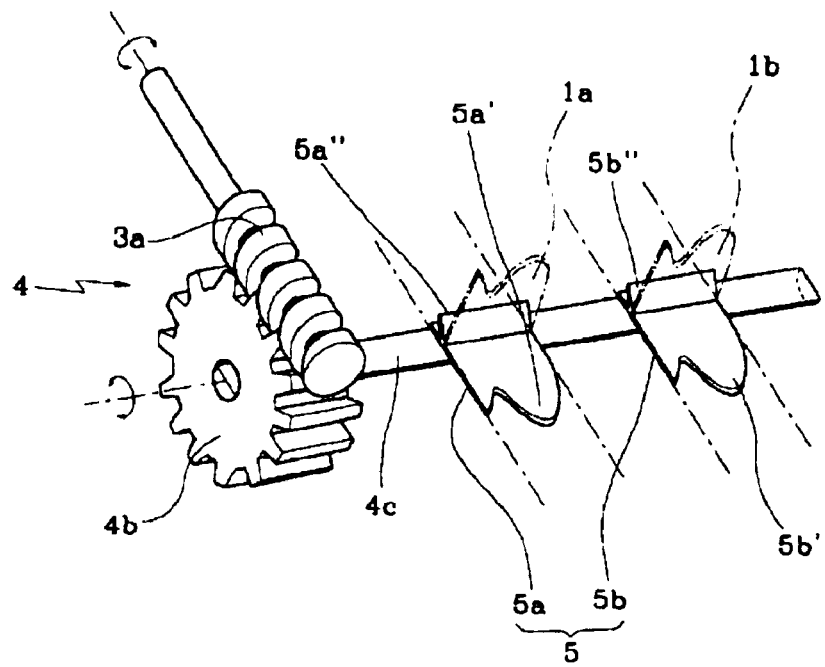
FIG. 2 is a schematic view of a driving system used in the embodiment of the invention shown in FIG. 1.
Figure 3:
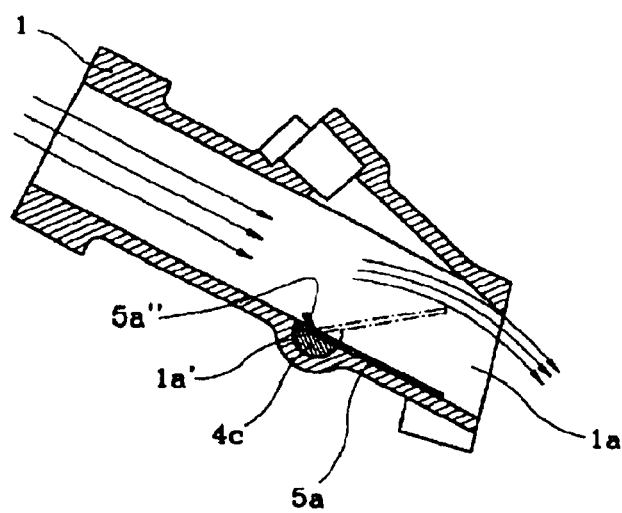
FIG. 3 is a cross-sectional view of the device shown in FIG. 1.

Each port is provided with a manipulator 4 that is operated by the actuator 2 to adjust the opening of each port (1a, . . . , 1n). The actuator 2 in the present embodiment is an electric motor 3 driven by a power source in the vehicle. Referring to FIG. 2, a worm 3a is formed on a rotary shaft of the electric motor. The manipulator 4 includes a worm gear 4b that meshes with the worm 3a and is rotated by the worm 3a. A rotary rod 4c is rotated by the worm gear 4b and penetrates the ports (1a, . . . , 1n) of the intake manifold 1. An opening/closing member (5a, . . . , 5n) is coupled to the rotary rod 4c in each port to open and close the passages of the ports (1a, . . . , 1n). The rotary rod 4c has a semi-circular cross-section, as shown in FIG. 3. Each port (1a, . . . , 1n) in the intake manifold 1 is formed with recess grooves (1a', . . . , 1n') that are also semicircular in cross-section to accommodate the rotary rod 4c. Thus, fuel-air mixture flow passing through the ports (1a, . . . , 1n) is not hindered by rotary rod 4c.

Returning to FIG. 2, an opening/closing member 5 includes a plurality of rotary plates (5a, . . . , 5n) each positioned in a passage of each port (1a, . . . , 1n) and attached to the flat side of the semi-circular rotary rod 4c. Preferably, one end of each rotary plate (5a, . . . , 5n) is welded to the flat side and the other end is formed with ends (5a', . . . , 5n') that have a wavy shape for causing the air flow to be turbulent. The rotary rod 4c is respectively disposed with blocking plates (5a", . . . , 5n') (see also FIG. 3) each slanted at a predetermined angle relative to the rotary plates (5a, . . . , 5n) for covering the recess grooves (1a', . . . , 1n') exposed by the rotary of the rotary rod 4c. These blocking plates (5a", . . . , 5n") prevent communication between the passages (1a', . . . , 1n') through the recessed grooves (1a', . . . , 1n').

Thus, when the ECU 6 sends control signals to the electrical motor 3, the rotary rod 4c is rotated via the worm 3a and worm gear 4b. The rotation of the worm 3a is received by the worm gear 4b to rotate the rotary plates (5a, . . . , 5n), causing an accurate and adjustable opening and closing of the rotary plates (5a, . . . , 5n). This rotation of rotary rod 4c rotates the rotary plates (5a, . . . , 5n), thereby adjusting the degree of each port(1a, . . . , 1n) is open. When the passages of the ports (1a, . . . , 1n) are narrowed by the rotary plates (5a, . . . , 5n), the amount of fuel-air mixture flowing through the passages is reduced. The flow of the fuel-air mixture becomes turbulent as well. This results in a more efficient combustion and less fuel consumption, improving the output of the engine below a predetermined engine speed. As a result, the polluting materials in the exhaust are reduced.

Figure 4:
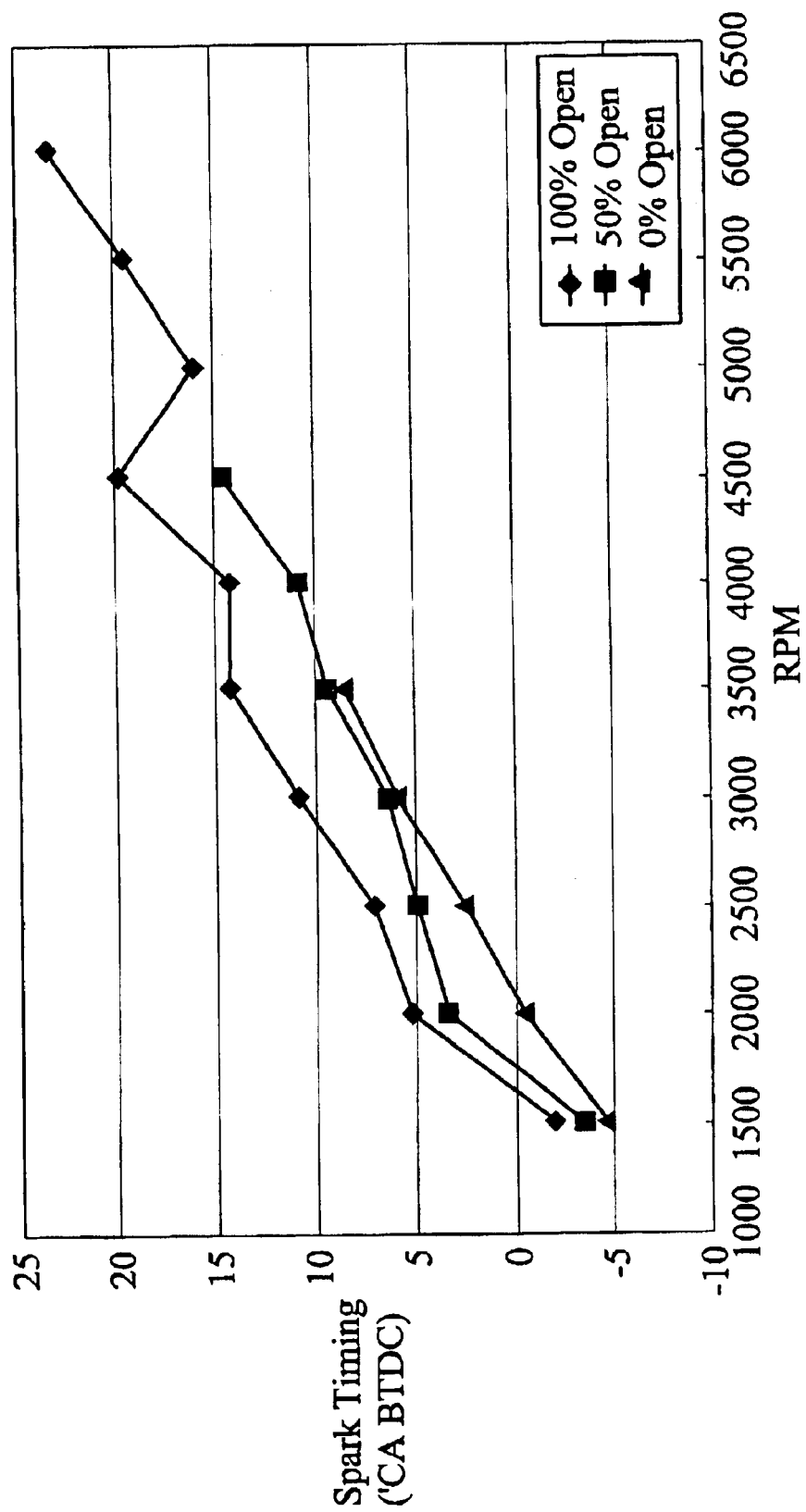
FIG. 4 is a graph showing ignition time change lines relative to changing the fuel-air mixture flow according to the present invention.
Figure 5:
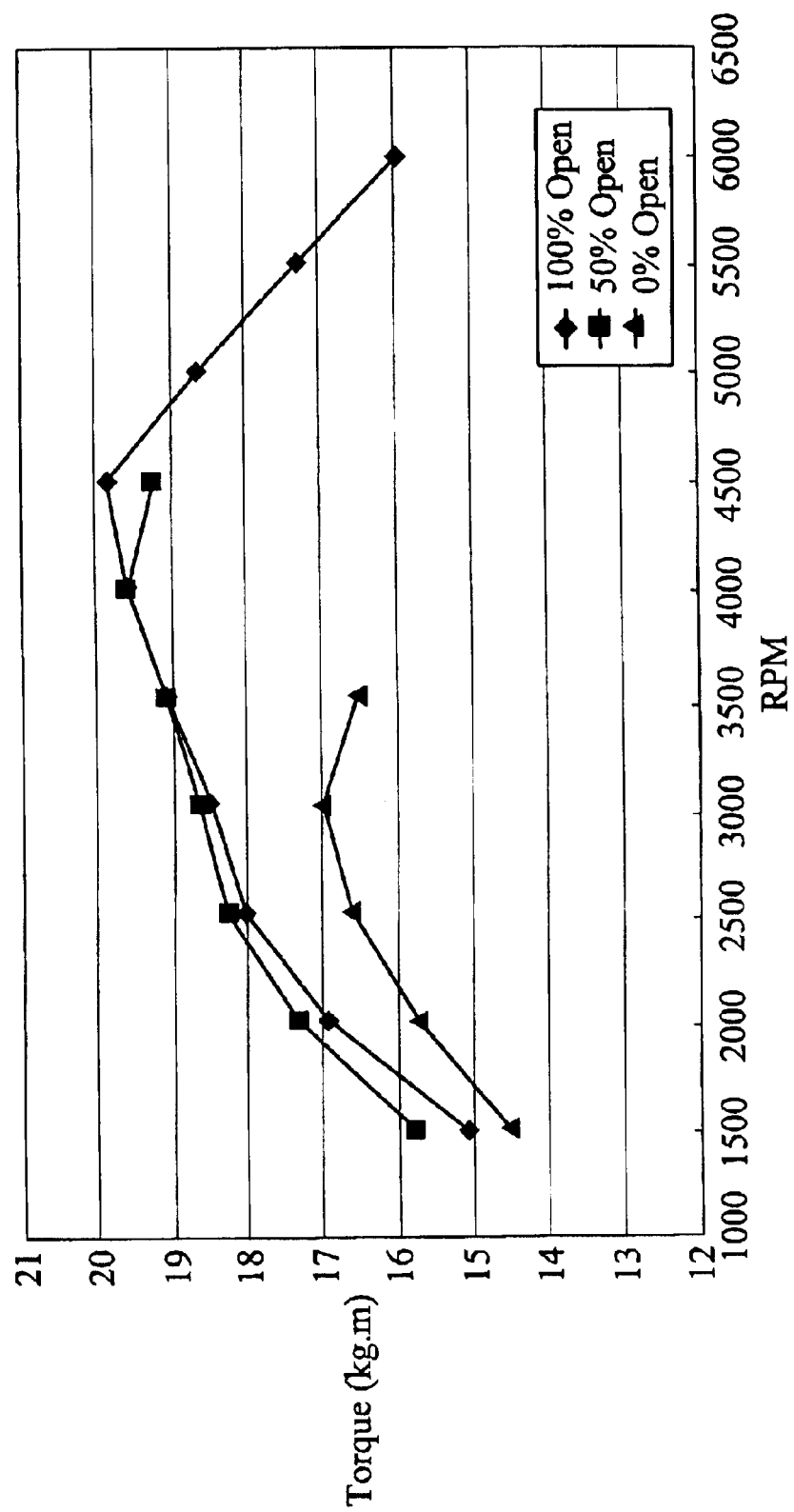
FIG. 5 is a graph showing torque change lines relative to changing the fuel-air mixture flow according to the present invention.

In a preferred embodiment of the present invention, the ECU 6 controls the amount of fuel-air mixture that flows into the combustion chamber through each port (1a, . . . , 1n) and delays ignition to improve the torque of the engine based on the position of the rotary plates. The ECU 6 controls the actuator 2 (FIG. 1) so that the manipulator 4 adjusts the amount each port is opened and closed. The ECU 6 delays the ignition timing, as illustrated in FIG. 4, to improve engine torque at a region below a approximately 3,500 RPM, as shown in FIG. 5. The method for delaying ignition timing will be well known to one of ordinary skill in the art. And the ECU determines the engine torque based on signals from sensors, such as a vehicle speed sensor, an acceleration pedal sensor, and others, as will also be well known to one of ordinary skill.

As shown in FIG. 5, the line corresponding to the complete opening of the rotary plates (100%) can be regarded as the experimental equivalent of a conventional intake manifold. Compared to this equivalent, opening the rotary plates (5a, . . . , 5n) half-way (50%) shows a relative improvement in engine torque at an engine speed below approximately 3,500 rpm. Thus, improving engine performance for situations where a large amount of torque is needed at lower rpms, such as driving the vehicle uphill. When the rotary plates (5a, . . . , 5n) are completely closed (0%), the overall torque is reduced. But polluting materials in the exhaust are also greatly decreased. Thus, when not much torque is needed, the engine can be operated to minimize environmental pollution.

As apparent from the foregoing, there is an advantage in the device for varying the flow of the fuel-air mixture to an engine according to the present invention in that the flow of fuel-air mixture into a combustion chamber via an intake manifold is varied to induce turbulent flow. In addition, ignition timing is delayed in parallel with reducing the flow of the fuel-air mixture. Thus, the present invention improves fuel efficiency, reduces exhaust, and increases engine torque.

The foregoing descriptions of specific embodiments of the present invention are presented for purposes of illustration and description. They are not exhaustive and do not limit the invention to the precise forms disclosed. Many modifications and variations are possible in view of the above teachings. The embodiments were chosen and described in order to best explain the principles of the invention and its practical applications, and to enable others skilled in the art to utilize the invention. It is intended that the scope of the invention be defined by the following claims and their equivalents.

What is claimed is:

1. A variable charge device for controlling the flow of the fuel-air mixture into an engine, the device comprising:

an actuator having an electric motor with a worm formed on a rotary shaft of the electric motor, wherein said actuator is configured to be mounted at one side of an intake manifold having at least one port, operating in response to control signals transmitted from an electronic control unit; and a manipulator that is operated by the actuator to adjust an opening of each port of the intake manifold, wherein said manipulator further comprises:

a worm gear that meshes with the worm and is rotated by rotation of the worm;

a rotary rod that is rotated by the worm gear and penetrates each port of the intake manifold, wherein the rotary rod is semi-circular in cross-section and each port is formed with recess grooves that are semi-circular in cross-section and that accommodate the rotary rod; and an opening/closing member for each port, the opening/closing members being coupled to the rotary rod to open and close the passage of each port.

2. The device as defined in claim 1, wherein the opening/closing member is comprised of a plurality of rotary plates, each rotary plate positioned in the passage of each port and fixed to the flat side of the rotary rod so that one end of each rotary plate is fixed to the rotary rod and the other end of each rotary plate has a wavy shape for causing turbulence.

3. The device as defined in claim 2, wherein the rotary rod is respectively provided with blocking plates, each slanted at a predetermined angle relative to the rotary plates for covering the recess grooves exposed to the passage by the rotation of the rotary rod.

4. A system for controlling a fuel-air mixture flow in an engine, comprising:

a plate disposed in a passage of an intake manifold, the plate rotatable about an axis to vary between a first position allowing a fuel-air mixture to flow relatively unhindered through the passage and a second position blocking the flow of the fuel-air mixture;

a rod attached to the plate so that rotation of the rod causes the plate to vary between the first and the second position, wherein said rod is semi-circular in cross-section and positioned within a semi-circular groove recessed within the intake manifold passage;

a first gear attached to the rod so that rotation of the first gear causes rotation of the rod;

a second gear that is rotated by a motor and is meshed with the first gear so that rotation of the first gear causes rotation of the second gear; and an electronic control unit programmed with instructions for controlling the motor so that the plate is positioned at a desired location from the first position through the second position.

5. The system of claim 4 wherein said electronic control unit delays ignition timing to the engine based on an engine speed and a position of the plate.

6. The system of claim 4 further comprising a plurality of plates disposed in a corresponding plurality of passages in the intake manifold.

7. The system of claim 4 wherein the plates are rotary plate and the rod is attached to an end of the rotary plate.

* * * * *